(12) United States Patent
Smith et al.

(10) Patent No.: US 7,911,693 B2
(45) Date of Patent: Mar. 22, 2011

(54) AMBIENT LIGHT ABSORBING SCREEN

(75) Inventors: Gilbert G Smith, Corvallis, OR (US);
Arthur Piehl, Corvallis, OR (US);
Thomas E Novet, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 441 days.

(21) Appl. No.: 11/496,774

(22) Filed: Jul. 31, 2006

(65) Prior Publication Data
US 2007/0217004 A1    Sep. 20, 2007

Related U.S. Application Data

(60) Provisional application No. 60/784,125, filed on Mar. 20, 2006.

(51) Int. Cl.
G03B 21/60    (2006.01)
(52) U.S. Cl. .......................... 359/459; 359/460
(58) Field of Classification Search .................. 359/449, 359/459, 455, 460; 264/1.34
See application file for complete search history.

(56) References Cited

U.S. PATENT DOCUMENTS

| | | | |
|---|---|---|---|
| 3,180,214 A | 4/1965 | Fox | |
| 3,191,495 A | 6/1965 | Miller | |
| 3,523,717 A * | 8/1970 | Glenn, Jr | 359/449 |
| 3,966,301 A * | 6/1976 | Brown | 359/455 |
| 4,235,513 A | 11/1980 | Vlahos | |
| 4,241,980 A * | 12/1980 | Mihalakis et al. | 359/455 |
| 4,297,001 A * | 10/1981 | Antes et al. | 359/459 |
| 4,636,035 A * | 1/1987 | Clausen et al. | 359/457 |
| 4,911,529 A * | 3/1990 | Van De Ven | 359/454 |
| 5,210,641 A | 5/1993 | Lewis | |
| 5,914,825 A | 6/1999 | Nishio et al. | |
| 6,120,845 A * | 9/2000 | Pease | 427/256 |
| 6,600,600 B2 * | 7/2003 | Chen | 359/459 |
| 6,636,355 B2 * | 10/2003 | Moshrefzadeh et al. | 359/460 |
| 6,728,032 B2 | 4/2004 | Peterson et al. | |
| 6,842,282 B2 * | 1/2005 | Kuroda et al. | 359/449 |
| 6,847,483 B2 | 1/2005 | Lippey et al. | |
| 6,859,314 B2 | 2/2005 | Yoon et al. | |
| 7,262,911 B2 * | 8/2007 | Niwa et al. | 359/459 |
| 2002/0001056 A1 * | 1/2002 | Sandberg et al. | 349/123 |
| 2005/0057804 A1 * | 3/2005 | Umeya et al. | 359/449 |
| 2005/0200952 A1 | 9/2005 | Niwa et al. | |
| 2007/0146876 A1 | 6/2007 | Peterson et al. | |

FOREIGN PATENT DOCUMENTS

EP    0 311 189 A1    4/1989
EP    0 421 809 A2    4/1991

OTHER PUBLICATIONS

Katagiri et al; High Contrast Front Projection Display System Optimizing the Projected Light Angle Range; IDW '03, pp. 1569-1572.

* cited by examiner

*Primary Examiner* — Christopher Mahoney

(57) ABSTRACT

A method of creating a projection screen includes forming on a substrate a set of reflective areas directed to a first set of angles and forming on the substrate a set of absorptive areas directed to other than the first set of angles.

14 Claims, 9 Drawing Sheets

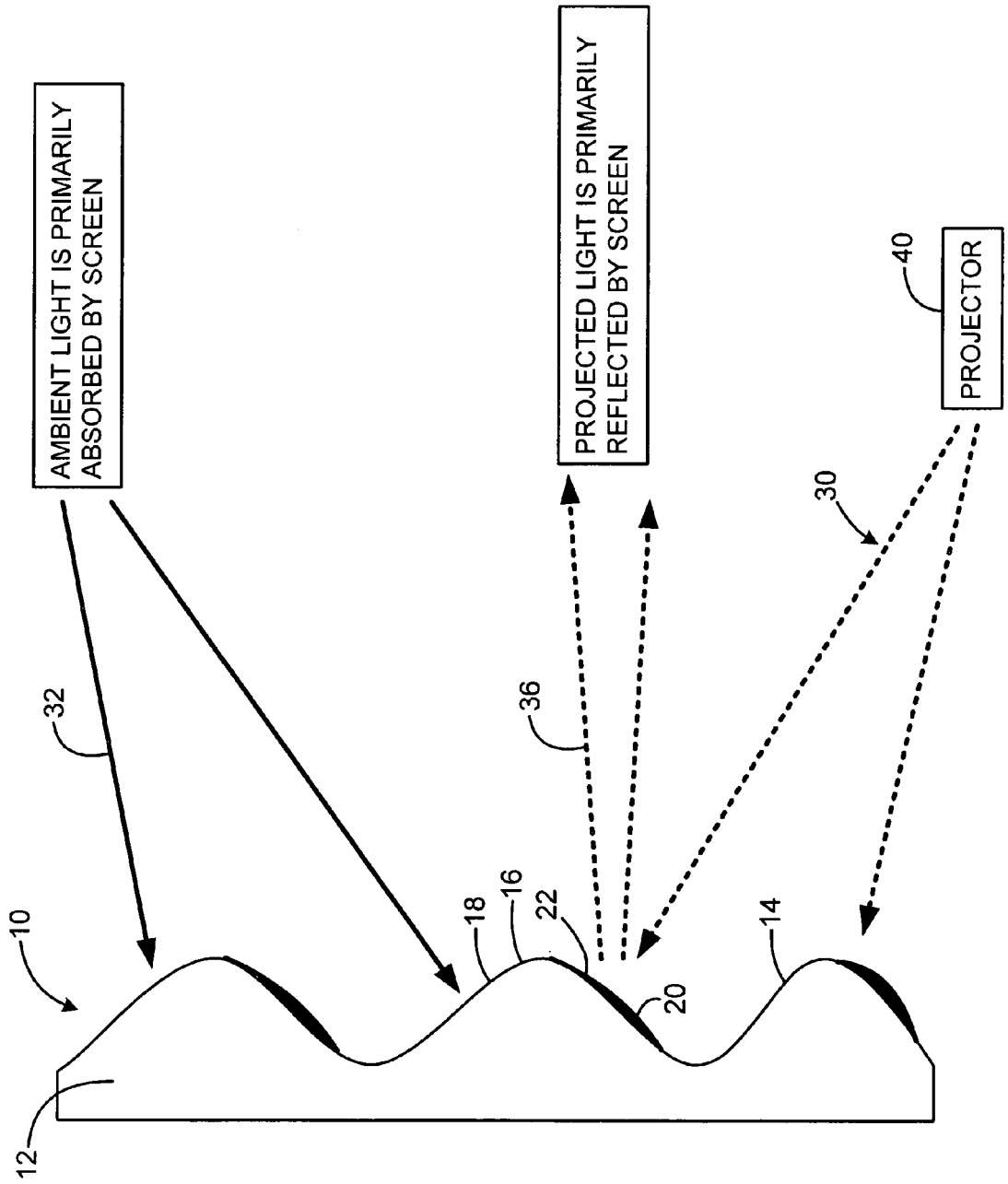

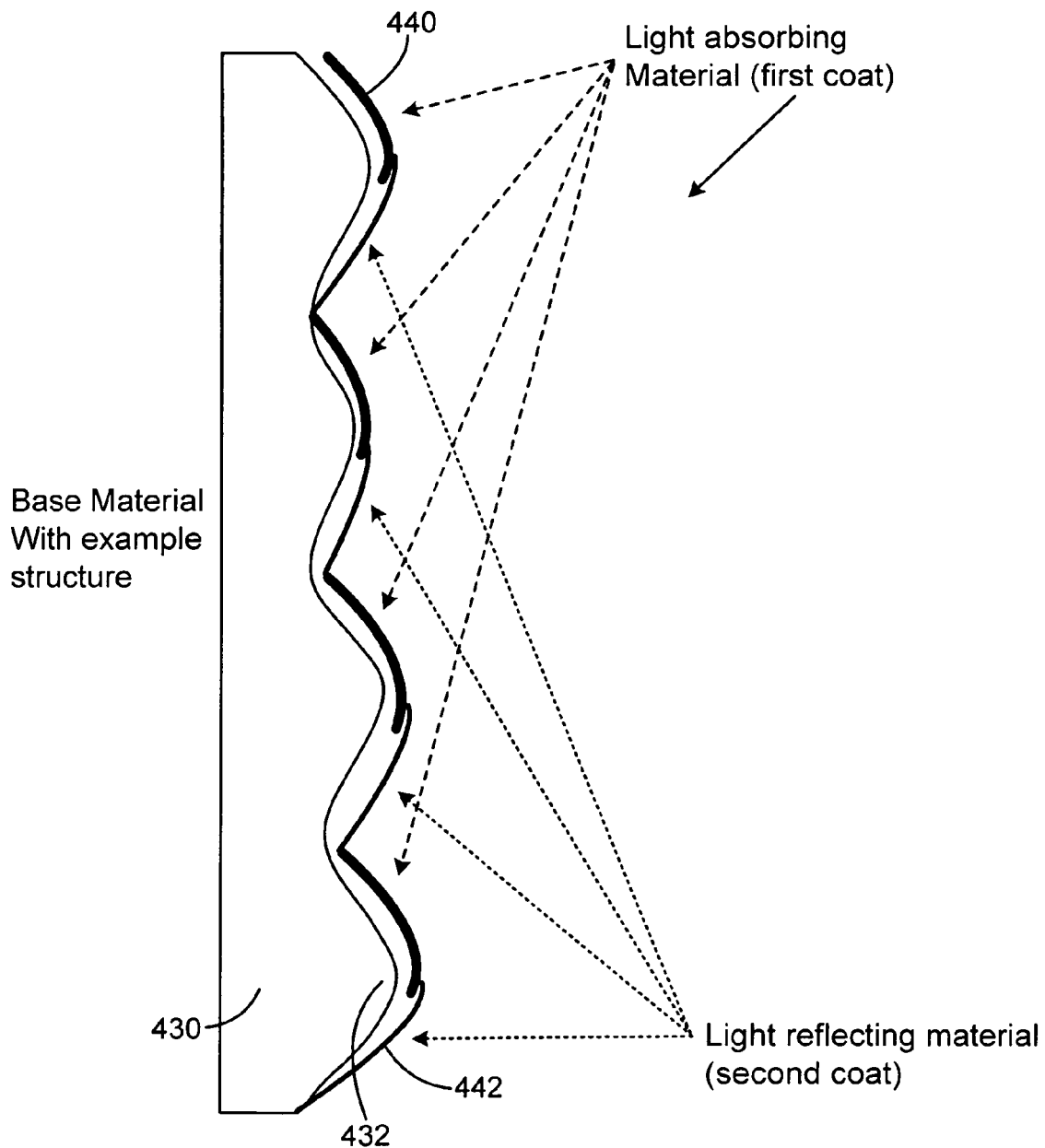

AMBIENT LIGHT ABSORBING SCREEN

CROSS-REFERENCE TO RELATED APPLICATIONS

This application claims the benefit of U.S. Provisional Application No. 60/784,125 filed Mar. 20, 2006, hereby incorporated by reference.

BACKGROUND

The contrast ratio of images projected on front and rear projection screens is severely reduced by the ambient light present in the viewing environment. That is, the darkest level on the screen perceived by a user is affected by how much ambient light is directed to the user from the screen. The brightest level on the screen is determined by the power of the projector. The contrast ratio is the division of the brightest level by the darkest level. For example, in a movie theatre, when the room lights are on the screen appears white or silver and this is the darkest image level available to the viewer. This effect is why the pre-show ads appear washed out. However, before the movie starts the lights are accordingly dimmed or turned off and the screen appears dark, thus lowering this darkest level. This dimming of the ambient light is done in order to allow for the majestic beauty of the cinema presentation. However, in some environments, such as in conference rooms, churches, and seminars, there is a need to keep the ambient light on to allow for note taking, participant movement, or to maintain conversational awareness.

Prior approaches to reducing the affects of ambient light have used grey screens to improve the contrast level but this technique also reduces the overall brightness of the image. Accordingly these grey screens required a more expensive projector that could cast more light to compensate. Another prior technique involved modification of surface geometry of the screen to include a transparent diffusion layer in front of a reflective layer. This approach had the effect of focusing more of the reflected projector light into a limited viewing cone which is called screen gain. Outside of this viewing cone, the picture quality dropped while inside the viewing cone, the brightness increased with limited effect on improving the contrast ratio as the ambient light also was affected by the screen gain. Some high-gain projection screens utilized an array of lenses over a reflective background to direct projected light back to a viewer. These screens did preferentially reject ambient light with respect to projected light but suffered from a severely limited viewing angle and tended to be relatively expensive.

Regretfully, most people choose to just live with the reduced contrast ratio rather than pay the exponentially increasing cost of more powerful projectors and custom screens. If only there were a better way, audience acceptance of projected images could be improved to better compete with direct view displays.

BRIEF DESCRIPTION OF THE DRAWINGS

FIG. 1A is a diagrammatic side view of an embodiment of a front projection screen with a textured surface to which material has been selectively added to make it reflective.

FIG. 8 illustrates another embodiment of a screen substrate, in which a first layer of light absorbing material is selectively deposited on portions of the surface features of the screen substrate which will be faced toward a source of ambient light, and a second layer of reflective material is selectively deposited on portions of the surface features facing the projector.

DETAILED DESCRIPTION

Figure 1B:
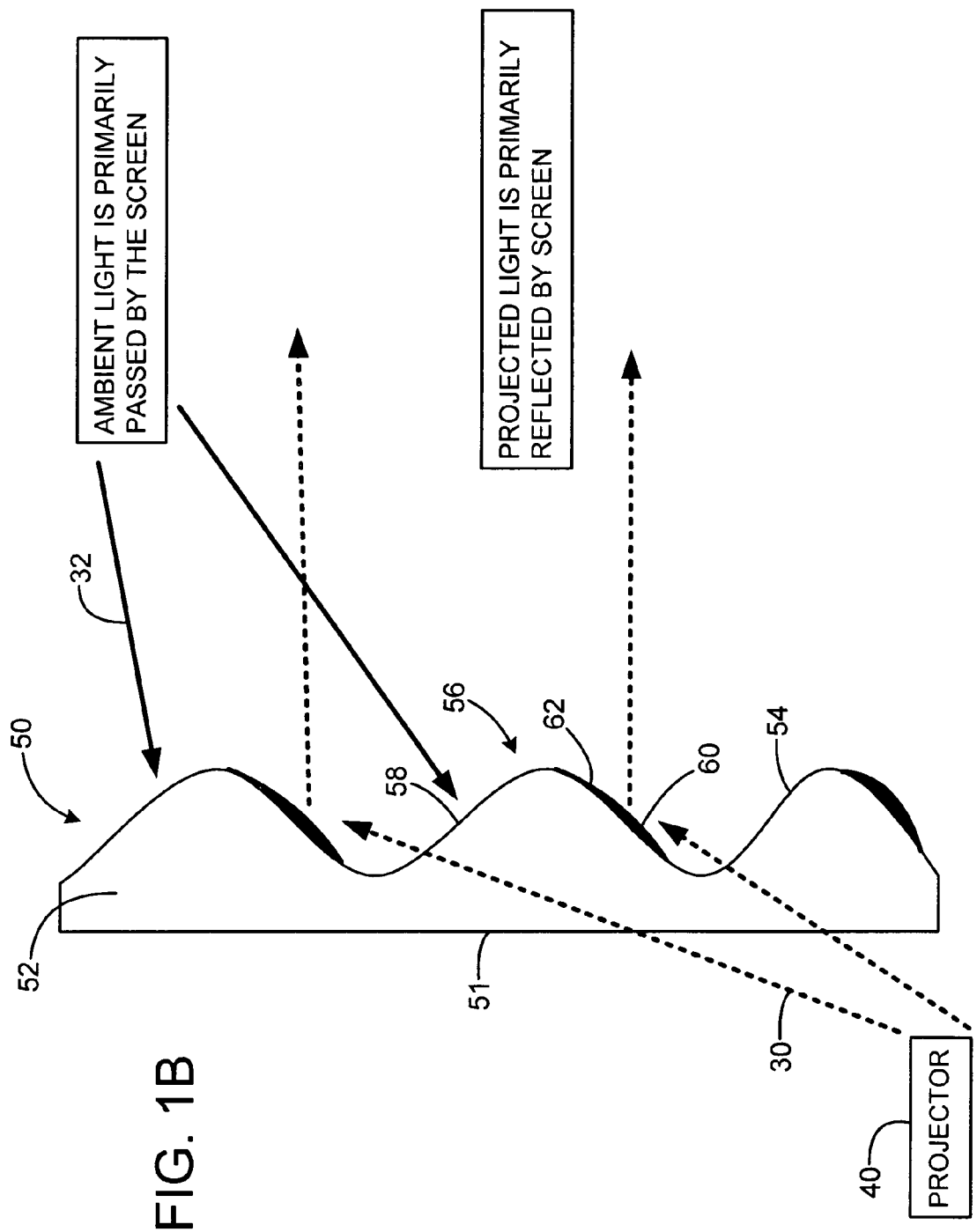
FIG. 1B is a diagrammatic side view of an embodiment of a rear projection screen with a transparent substrate having a textured surface to which material has been selectively added to make it reflective.

In the following detailed description and in the several figures of the drawing, like elements are identified with like reference numerals. The figures are not to scale, and relative feature sizes may be exaggerated for illustrative purposes.

In order to improve the contrast ratio of a projection system, whether it be a front or a rear projection display, this disclosure describes techniques for balancing improvements in projector light reflectivity and ambient light absorption. That is, the portion of the surface features of a screen that faces the projected light to be directed to the viewer, should be reflective while the other portions of the surface should be absorptive. Thus, this disclosure describes screens and techniques for performing "angular absorption" and "angular reflection" versus the conventional technique used in high gain screens which just restrict "angular reflection."

Accordingly, this disclosure enables both front and rear projection screens which overcome the aforementioned disadvantages and shortcomings of conventional screens. These new screens preferentially absorb ambient light relative to projector light thereby improving perceived image quality through a perceived higher contrast ratio without sacrificing perceived image brightness.

Disclosed are projection screens which are simple, inexpensive to manufacture, and light weight. One embodiment disclosed is directed to a projection screen comprised of a substrate textured with a plurality of generally uniform (at least on average over the surface of the screen) geometric features. In this embodiment, a layer of reflective material is selectively deposited on a portion of the surface of each of the features thereby forming an array of surfaces mostly reflective of light incident at some angles incident to the screen and mostly absorptive of light incident at other angles. The substrate may be made rigid or flexible, flat or curved as a particular application demands. The geometry of the features and the angle at which the material is deposited can be varied according to the particular application to account for such factors as the position of the ambient light sources, the screen orientation, and the projector's relative position to the screen.

One exemplary geometry for the screen's surface features is an array of indentations and protrusions created by embossing, photolithography, chemical or laser etching, or otherwise as will occur to those skilled in the art. The pattern of reflectivity on the surface features forms an array of unique micro-reflectors. In general, the reflective portion of the features' surfaces is what will be illuminated by the projector. Light from the projector that does not strike a particular portion of the reflective portion of the features' surface is accordingly made light absorbing to prevent ambient light from being directed to viewers.

Accordingly, one exemplary technique starts with an absorptive surface and uses vacuum metal deposition at a glancing angle to the screen's surface to create a reflective surface on a limited portion of each feature's surface. For a given angle of deposition, each feature's geometry shades portions of the feature's surface from deposition, leaving that shaded portion light absorbing. Aluminum or any other material exhibiting a high coefficient of reflectivity may be utilized to achieve reflectivity. A desired pattern of reflectivity may be achieved by varying the angle of vacuum deposition across the height and breadth of the screen. The combined effect of such an array of unique reflective surfaces is to reflect light coming from a projector at one set of angles while absorbing ambient light arriving outside that set of angles thereby improving the perceived contrast ratio.

Embodiments of a projection screen include a substrate textured with a plurality of features. These features may be generally uniform geometrically shaped features or the features may be irregularly shaped or randomly shaped, or consistently shaped but randomly oriented. These features may be projections from the surface or depressions into the surface. A layer of material may be selectively deposited on or selectively removed from a portion of the surface of each of the features to form an array of surfaces. These surfaces are mostly reflective of light incident at some angles and mostly absorptive of light incident at other angles. The substrate itself may be rigid or flexible, flat or curved. The features may be non-continuous over the surface of the substrate, which may reduce or eliminate perceptible lines in the reflected image light.

In other embodiments, the projection screen may provide ambient light reflection or absorption, without enhancement of reflection toward the viewer. That is, the non-absorptive portion may be the substrate's normal surface without additional coatings or depositions. In other embodiments, the projection screen may provide surfaces angled to reflect projector light toward the viewer, without enhancement of absorption or reflection of ambient light to reduce ambient light reflection from the screen to the viewer. However, to maximize the perceived contrast ratio, the portion of the surface features of the screen facing the projected light, which is desired to be reflected to the viewer, are reflective while the other portions, typically facing ambient light from directions other than the projected light, whether from the side or above or below the screen e.g., from windows, skylights, doors, etc., are absorptive.

The geometry of the features and material deposition angle can be varied according to the application particulars such as ambient light, screen, and projector positions. One specific geometry includes an array of indentations and protrusions. The features may be created by embossing or by other techniques. In one embodiment, the pattern of reflectivity on the features may form an array of micro reflectors. In general, the reflective portion of the feature surfaces is what will be illuminated by the projector. If light from the projector will not strike a particular portion of the face, then it is configured to be light absorbing.

For example, in one embodiment the screen substrate is formed of a light absorbing material and a reflective layer is selectively deposited on portions of the surface features facing the projector.

In another embodiment, the screen substrate is formed of a light-reflective material and a layer of light absorbing material is selectively deposited on portions of the surface features which will be faced toward a source of ambient light. Alternatively stated, a layer of light absorbing material is selectively deposited on those portions of the surface features which do not face the projector. In another embodiment, a layer of light absorbing material is selectively deposited on portions of the surface features of the screen substrate which will be faced toward a source of ambient light, and a reflective layer is selectively deposited on portions of the surface features facing the projector.

In another embodiment, a surface layer, e.g. a light absorbing or a light reflecting layer, is selectively removed to expose light reflecting portions of the substrate or an underlying layer, or to expose light absorbing portions of the substrate or an underlying layer, respectively.

In another embodiment, a substrate formed of a light absorbing material has metal deposited at a glancing angle in a vacuum to create a reflective surface on a limited portion of each feature's surface. For a given angle of deposition, each feature's geometry will shade portions of the feature's surface from deposition, leaving that portion light absorbing. The ratio of reflective area to absorptive area can be about 20/80, about 40/60, about 50/50, about 60/40, or about 80/20 depending on the particular surface geometric features. For instance, when the surface features are randomly spaced but have an average spatial distribution about the same as the average height of the surface features, the ratio of reflective area to absorptive area is about 50/50.

Aluminum or other material exhibiting a high coefficient of reflectivity may be utilized to achieve reflectivity. A desired pattern of reflectivity may be achieved by varying the angle of deposition across the height and breadth of the screen. The effect of such an array of reflective surfaces is to reflect light coming from a projector while absorbing ambient light not coming from the same angle, thus enhancing screen performance.

Details of particular embodiments are further described but are only meant to be exemplary examples of the claimed subject matter. In particular, exemplary embodiments for front view and rear view screens are presented as well as some exemplary methods of fabrication. Other embodiments exist, and the disclosed particular embodiments are only meant to describe and enable those of skill in the art how to practice the claimed invention. Thus the scope of the invention is only limited by the claims and not just these particular embodiments.

Front View Embodiment

FIG. 1A illustrates an embodiment of a projection screen 10 which may be used in a projection system including a projector 40 which directs projector light 30 onto the screen. The screen 10 includes a substrate 12 with a textured surface 14. In one embodiment, the front facing surface of substrate 12 is textured with a plurality of generally uniform features 16 that are generally uniformly spaced apart. The geometry of the features 16 is representative of various possible geometries. The dimensions of the features such as profile, height, and slope of sides, can be varied to affect the surface reflectivity pattern and the ratio of reflective area to absorptive area. Alternative feature geometries include symmetric, asymmetric, or irregularly shaped, as may be utilized in different embodiments according to the requirements of the application. The features may include convex hemispheres or conic sections, concave hemispheres or conic sections, or a combination of convex and concave conic sections.

For instance, the substrate 12 may be fabricated of a dark, light-absorbing material, such as black pigments, particle coated fabrics such as SiC emery paper, thinfilm coated absorbers with high absorption coefficients such as Silicon Carbide (SiC), Aluminum Nitride (ALN), or Titanium Nitride (TiN), tuned induced absorber stacks (dielectric/metal stacks where the thicknesses are tuned for high absorbance), or metal-ceramic composites with high absorption coefficients.

Each feature 16 has a surface region which faces away from projector 40, e.g. surface region 18, and a surface region which faces the projector, e.g. surface region 20. In one exemplary embodiment, the surface regions which face the projector may be angled from the normal of the surface of the substrate, e.g. in a range of angles from about 5 degrees to about 45 degrees, although this may vary depending on various factors including the placement of the projector relative to the screen and the size of the surface features. The projector-facing regions 20 may be made reflecting with a light reflecting layer or coating 22, which may be, for example, aluminum. Other materials or techniques for achieving light reflectivity in selected regions of the substrate may alternatively be employed. The non-projector-facing surface portions 18 are non-reflective of incident light.

Projector light 30 incident from projector 40 is reflected by the highly reflecting, projector-facing surface regions 20. Ambient light 32 incident on the non-reflecting regions 18, e.g. from above or from a side of the screen, is absorbed and/or weakly reflected by the surface regions 18. Because projected light is reflected more efficiently than ambient light due to the placement of the reflective layer 22, the perceived image contrast is increased as most of the incident light reflected back to a viewer is projected light and the ambient light does not affect the black levels as much as with conventional screens.

Rear View Embodiment

FIG. 1B illustrates one embodiment of a rear projection screen 50. The screen includes a transparent substrate 52. The substrate 52 is fabricated of a translucent or transparent material, such as acrylic or polycarbonate. The front facing surface 54 of the substrate is textured with a plurality of generally uniform features 56 that are generally uniformly spaced apart. The geometry of the features shown is representative of various possible geometries. The dimensions of the features such as profile, height, and slope of sides, can be varied to affect the surface reflectivity pattern. Alternative geometries include symmetric, asymmetric, or irregularly shaped, as may be utilized in different embodiments according to the requirements of the application.

Each feature 56 has a surface region which faces away from the projector, and a surface region which is angled to reflect the light coming from the projector. The angled reflector surfaces are made reflective, e.g. with a light reflecting layer, which may be, for example, aluminum or protected silver. The non-projector-facing surface portions are transparent and pass ambient light away from the viewer rather than reflecting it.

Projected light 30 incident on the screen from an image source 40 behind surface 51 of the substrate 52 passes through the substrate, and is reflected by reflective regions 62 toward a viewer. Ambient light 32 incident on surface 54 in the directions illustrated in FIG. 1B is primarily absorbed or reflected back toward the ambient light source, or passed through the transparent portion and not reflected to the viewer. Any surface reflection from ambient light may additionally or alternatively be directed in a direction other than the viewer, e.g. back toward the source of the ambient light.

In one embodiment, the substrate is transparent material and portions of the surface are transformed to a reflecting state. In another embodiment, the substrate surface may be a light reflecting material, and a portion of that surface which does not face the projector 40 is made transparent by etching or other means.

Figure 1C:
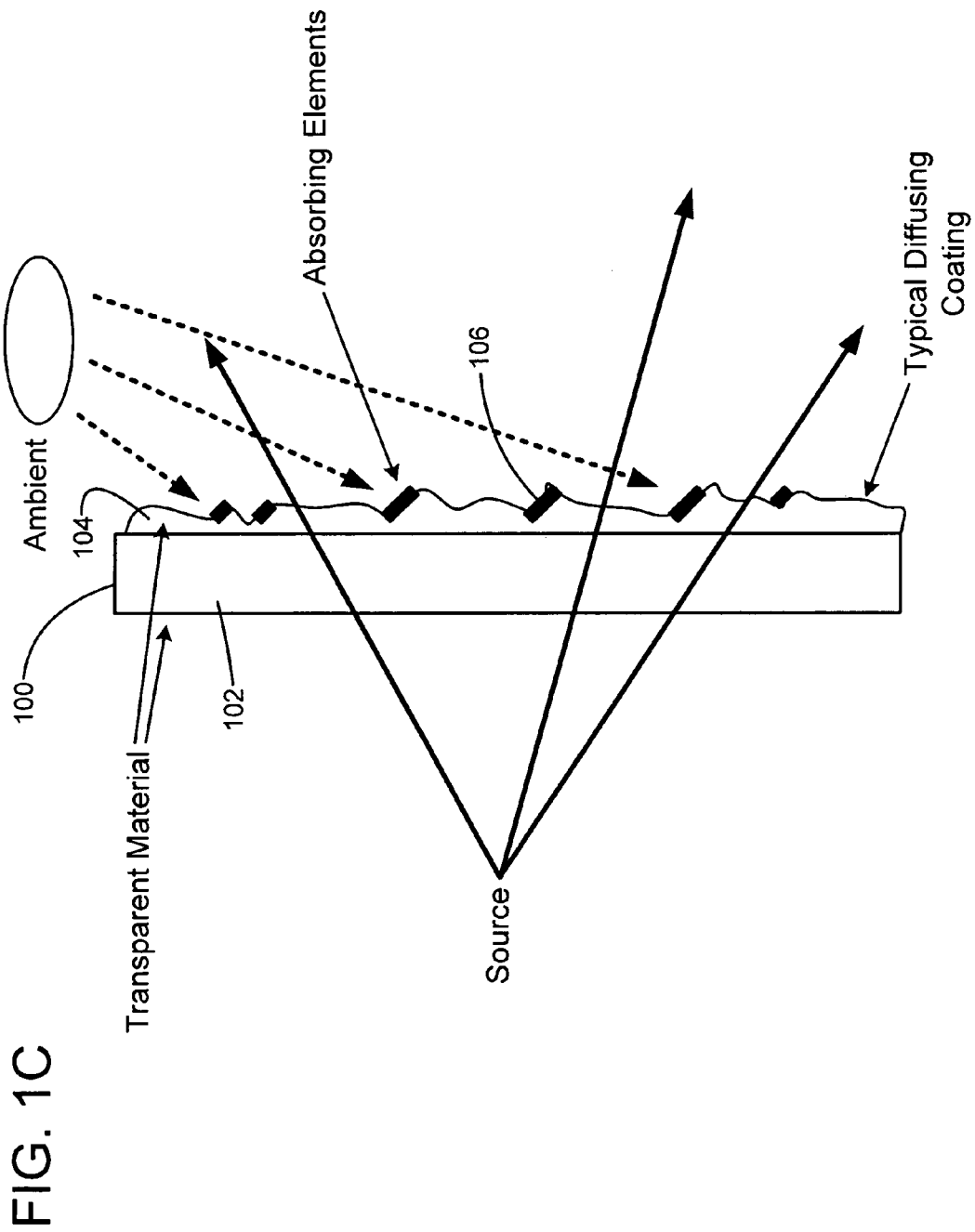
FIG. 1C illustrates another embodiment of a rear projection screen or LCD display.
Figure 2:
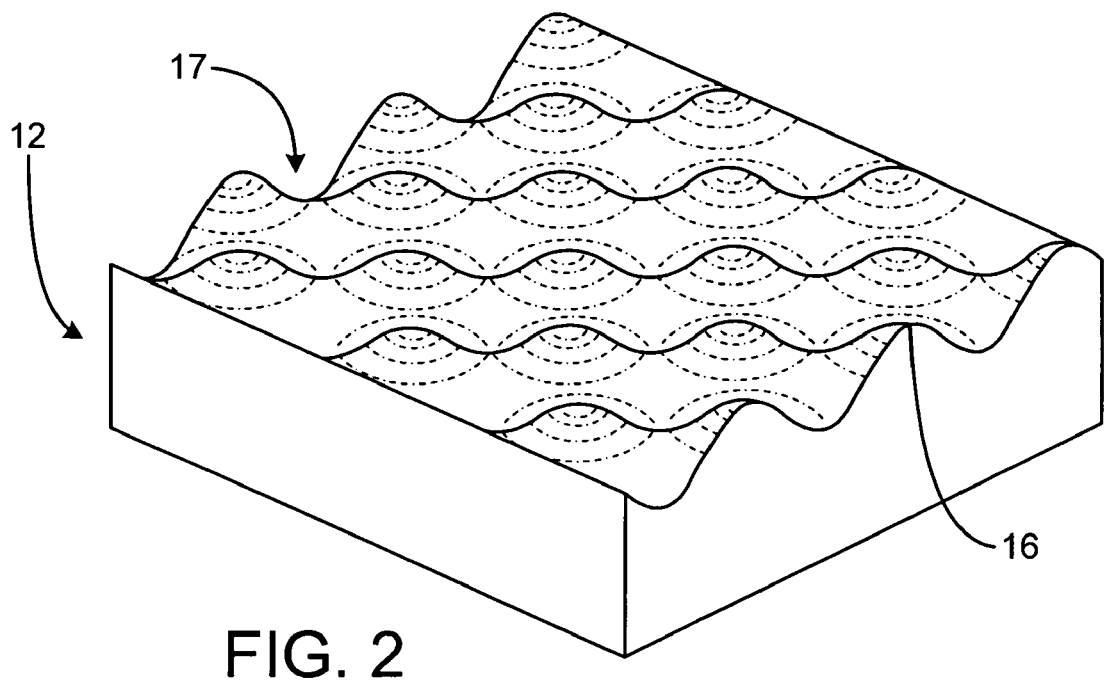
FIG. 2 is an isometric view is an embodiment of a textured substrate.

FIG. 1C illustrates another embodiment of a rear view screen 100. In this embodiment, the screen 100 includes a substrate 102 of a transparent material, having a front surface on which a textured coating 104 is applied. The coating 104 may be a diffusion coating to diffuse light passing through the coating. The coating 104 has a textured surface, on which absorbing elements 106 are applied in directions facing a source of ambient light. Image light from a source behind the screen passes through the screen to the viewer, while ambient light from the ambient light source is substantially absorbed by the absorbing elements 106 rather than being reflected to the viewer. The image source may be, for example, a projector, a light box static display, or an LCD.

Various light absorbing materials such as black pigments or thin film coated absorbers may be utilized as light absorbing surfaces.

The features may be formed in the substrate by embossing. Other techniques for forming features in a substrate may alternatively be employed. Alternative methods of forming features in a substrate include hot stamp rolling and micro-machining.

Alternative embodiments of a front or rear view screen include, for example, dark glass beads on a dark substrate, irregularly shaped particles on a substrate surface, woven materials having an appropriate weave, a substrate with micro posts, and cloth-like materials with an inherent surface structure. In the embodiment in which a screen is fabricated from a woven material, the material may or may not have extra features or particles in addition to the woven material. The woven material may have a three-dimensional surface profile. Added features such as particles applied to the surface of the woven material may tend to enhance the randomness of the response. The thread of woven material may be coated with reflective or absorptive material with the weave of the material to be considered the surface "features." Further exemplary materials from which the screen may be fabricated include Polyvinyl Chloride (PVC), Polypropylene (PP) and Polyethylene Terephthalate (PET) at exemplary thicknesses between about 3 mils to 12 mils. For a flexible screen, further exemplary materials for the substrate may include a 3 ply material with PVC/fabric/PVC; an exemplary fabric is fiberglass cloth. An exemplary thickness range for the 3-ply material is 8 mils to 30 mils, or between 10 mils and 15 mils.

Exemplary Methods of Fabrication

One method for fabricating a front or rear view screen involves providing a substrate with a textured surface, and coating the surface by deposition at low angles. The substrate may have a high reflectance, such as a textured metallic or white surface. In this case the low angle deposition may provide a low reflectance such as a dark paint or thin-film absorber. In an alternative embodiment, the substrate may be a good light absorber, and the low angle deposition may be a high reflectance deposition such as white paint or metallic coating. One embodiment of a screen may be fabricated by evaporating aluminum at low angles onto textured surface substrates. Alternatively, low-cost embossed substrates may be employed as the textured surface substrate with periodic, random, or pseudo random structures.

Various other embodiments of initial textured substrates include micro-machined or micro-embossed substrates, embossed plastics, papers or cloth surfaces or glass-beaded surfaces. These surfaces may also include periodic, random, or pseudo random structures. Various embodiments of low angle depositions include high vacuum evaporation and vapor deposition. The particular angle or angles of the deposition may depend on the application and the geometry of the substrate surface. An exemplary range of low angle deposition angles include the range of from 5 degrees to 45 degrees, as measured from the surface of the substrate. For deposition of reflecting materials, the reflective surface angle may be between an angle of incidence of projector light and an angle of sight to the viewer. The angle of deposition may also be larger than 45 degrees for some embodiments, e.g. 90 degrees, depending on the fabrication technique and shape of the surface features, e.g. including flat tops of features.

In particular embodiments, the feature size may be large enough to avoid diffraction and interference effects, and small enough to avoid pixilation or sparkle to the human eye. One exemplary range is from around 75 microns to 150 microns in width, and of comparable height depending on the viewing distance, projector position, ambient position, and desired ambient rejection properties. Another exemplary range is from 4 microns to 20 microns. Yet another exemplary feature size range is from around 75 microns to 500 microns or even larger. Other embodiments may use features of larger scale, e.g. when the viewing distance from the screen is relatively large.

Figure 3:
FIG. 3 is a photographic image of an embodiment of a substrate on which a low angle deposition has been performed.

FIG. 3 is a depiction from a scanning electron microscope image of an embodiment of a substrate imbedded with black irregularly shaped particles on which aluminum had been deposited at a low glancing angle from the surface horizon. The substrate in this embodiment has a rough, randomly textured surface, i.e. a rough surface. The dark regions are the uncoated portions of the substrate, and the lighter regions are the coated portions (i.e. coated with aluminum) of the substrate.

Figure 4:
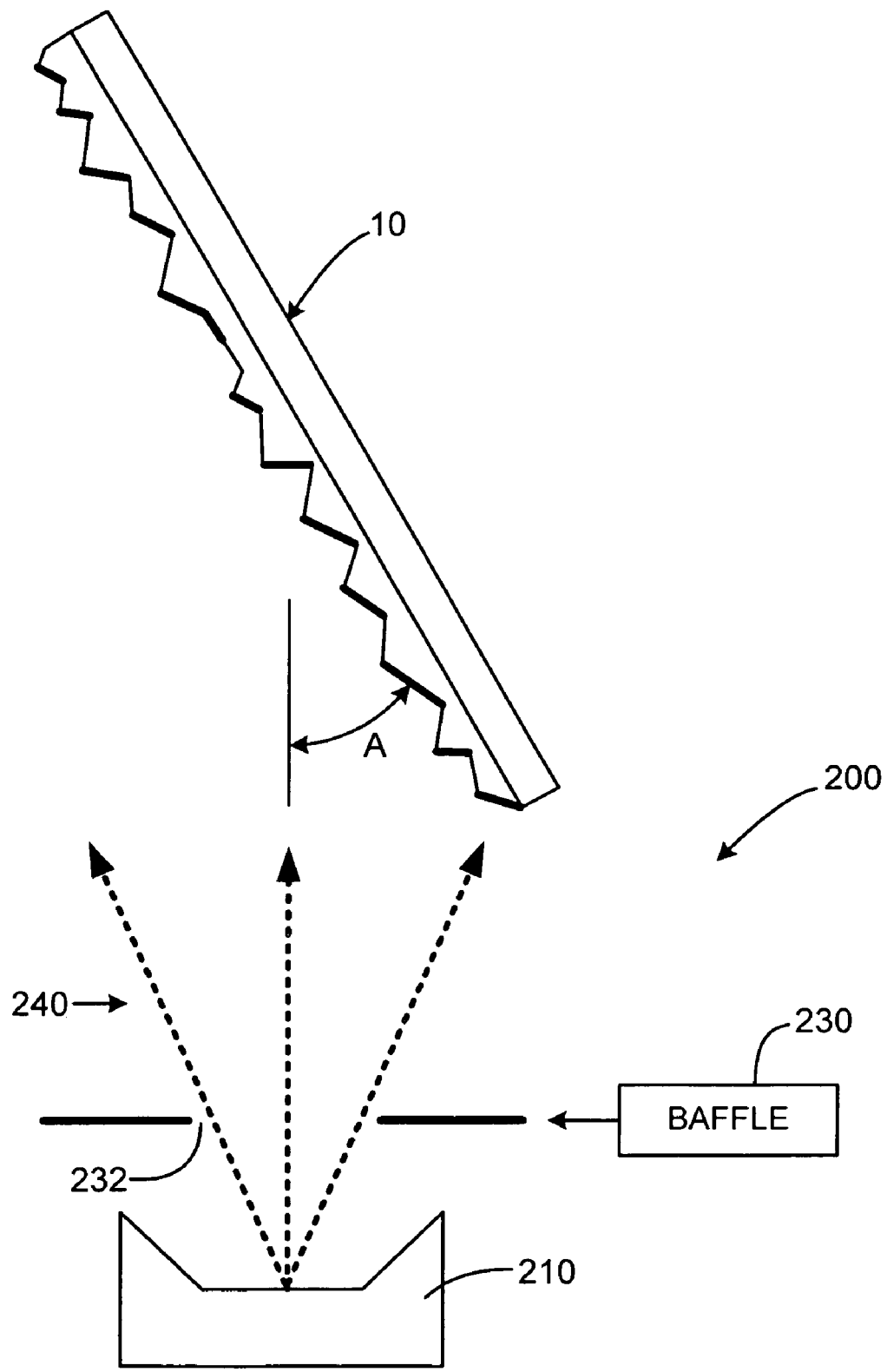
FIG. 4 schematically depicts an embodiment of a deposition system for low angle deposition of a material onto a substrate.

FIG. 4 illustrates an exemplary vapor deposition system 200 for depositing a layer of material at low angles onto a textured substrate 10 at a glancing angle, e.g. less than normal to the general plane of the substrate 10, or at a low angle typically similar to, but not limited to, the angle of incidence of projector light onto the substrate surface. The system includes a source of the deposition material 210. A stream of deposition material particles is directed through an opening 232 in a baffle 230 toward the surface of the substrate, which is supported so that the particles generally have a low angle A of incidence on the substrate, e.g. between 5 degrees and 45 degrees. The baffle opening in one embodiment serves to provide a limited angular range stream 240 of particles to make it somewhat collimated. It can be seen that the baffle 230 may determine the actual range of angles of deposition on the substrate and hence which portions of each feature's surface is coated with the reflective material. Some portions of a feature's surface may be shaded from deposition by other features.

Figure 5:
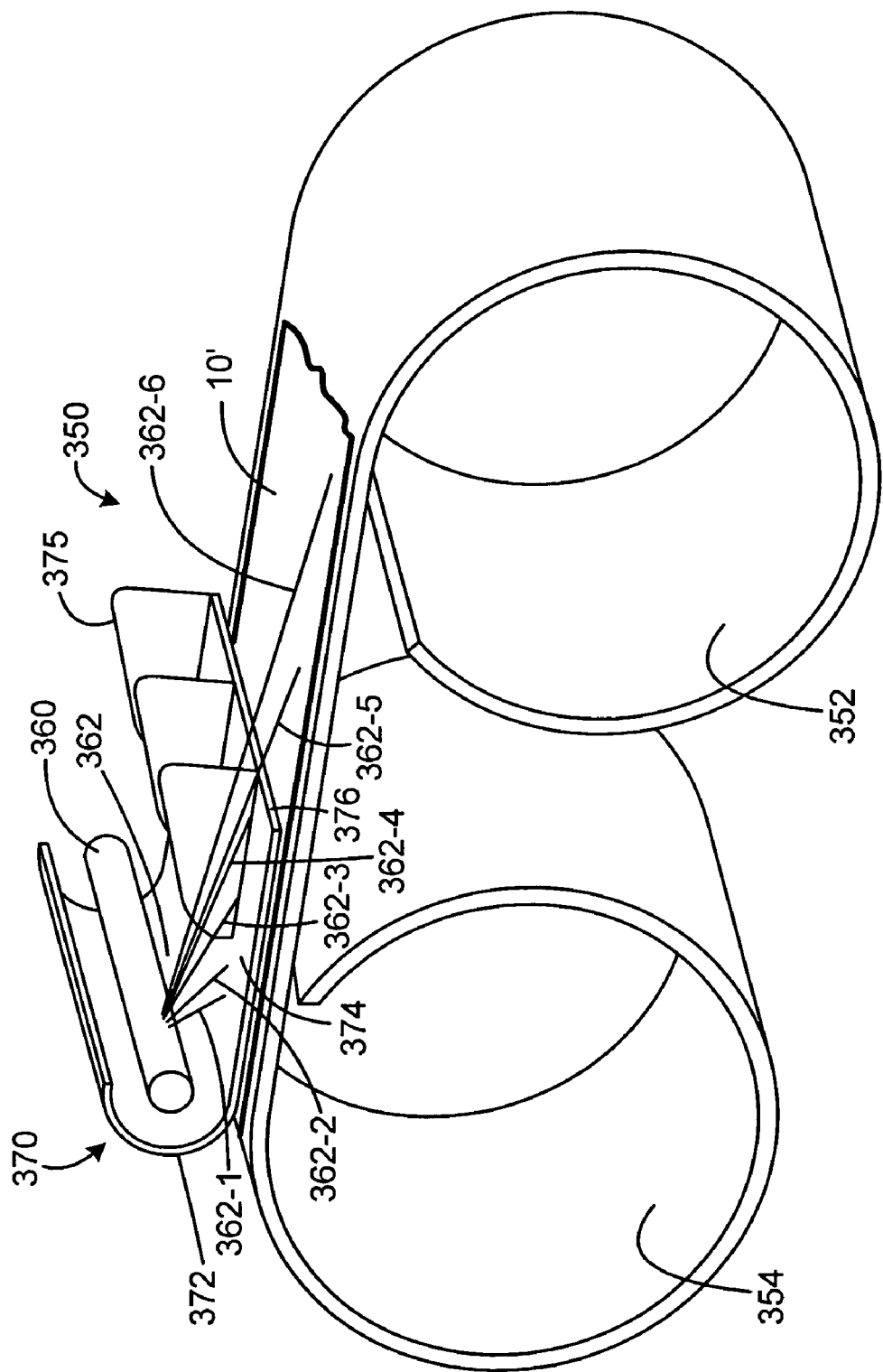
FIGS. 5 and 6 schematically depict another embodiment of a deposition system for low angle deposition of a material onto a substrate.
Figure 6:
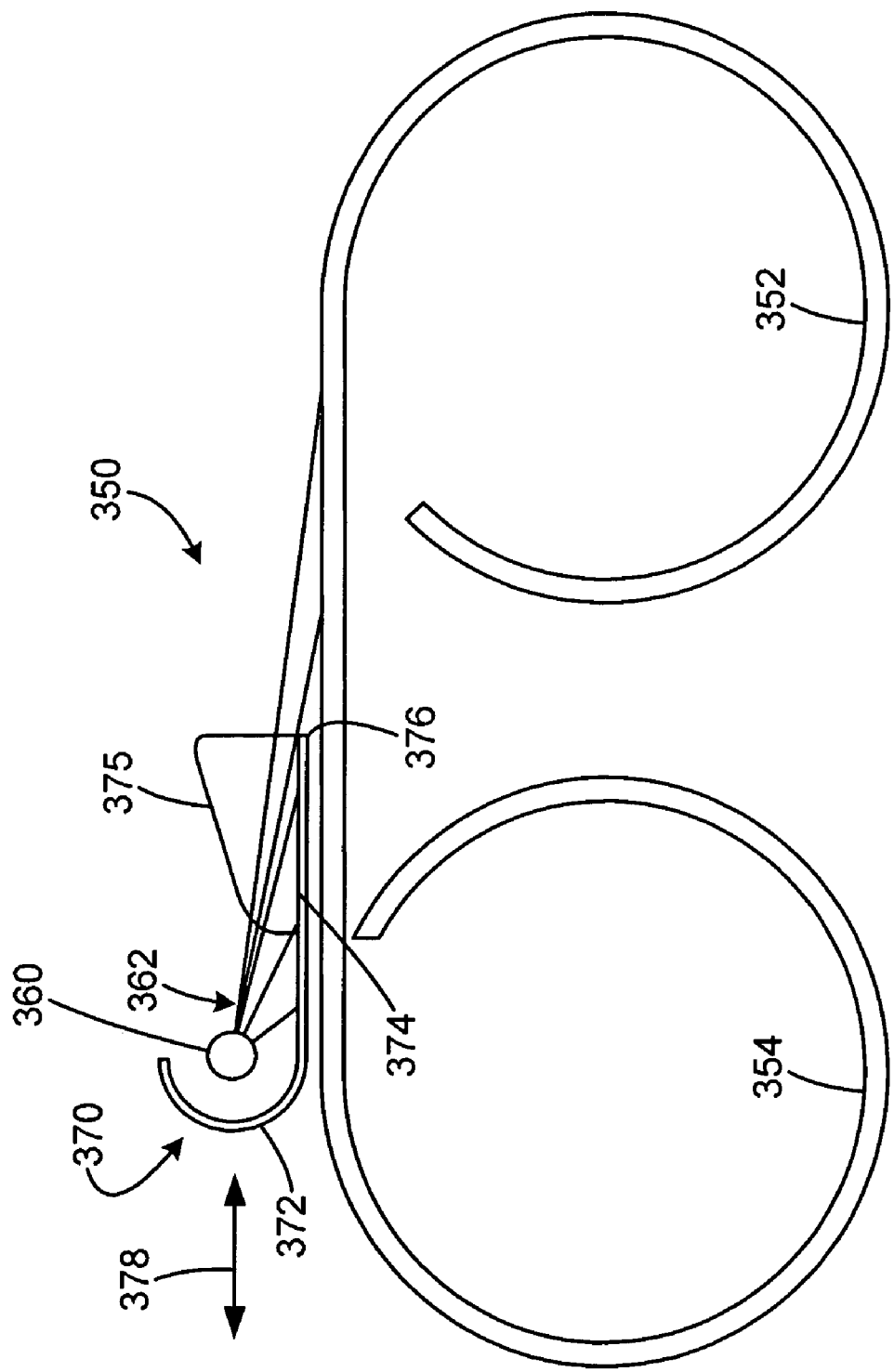

FIGS. 5 and 6 depict diagrammatically another embodiment of a method and system 350 for deposition of a layer of material at low angles onto a textured substrate 10'. The substrate 10' in this embodiment is a flexible substrate formed on a roll 352. An end of the substrate roll is reeved about a take-up roller 354, allowing the surface of the substrate 10' to be advanced through the deposition material stream. After the coating layer has been applied through the deposition process, the substrate roll may be cut into lengths/widths of suitable size for a given screen application.

The system 350 includes a source 360 of the deposition material, which may be in the form of a rod. If the layer to be deposited is an aluminum layer, for example, then the source 360 may be a rod of aluminum.

In this particular embodiment, the system 350 includes a baffle system 370 that moves dynamically relative to the source material target 378. One embodiment of the shield includes a curved baffle portion 372 and a generally planar baffle portion 372 which terminates in an edge 374. Upright baffle fin portions 372 extend upwardly from the planar portion 374 and provide for control over angles of deposition incidence onto the substrate in an azimuth direction. By placing the fins closer together the azimuth direction is more tightly controlled. The streams of particles, at an angle close to the normal direction, are passed between the fin portions and streams of particles impinging on the fin portions are blocked.

The length of the planar portion 374 may be selected to position the baffle edge 376 to control the deposition elevation angle range. The stream of particles is depicted in FIG. 6 as 362 and includes particle streams 362-1 . . . 362-6 of varying angles of incidence in relation to the plane of the substrate undergoing the deposition process. The streams range from shallow (stream 362-6) to more direct 362-1. Depending on the length of the planar portion 374 between the source 360 and the edge 364, one or more of the particle streams may be blocked by the baffle. In the example of FIG. 6, the baffle is designed and positioned to allow relatively shallow angles of stream (362-5 and 362-6) to intercept the substrate 10' with the baffle blocking streams 362-1 . . . 362-4.

The baffle 370 may be positioned on a shuttle apparatus to move the baffle along axis 378 to vary the position in relation to a stationary deposition source 360. Thus, this technique allows for varying the angle of deposition incidence.

The source material on the target 360 is sputtered or evaporated in vacuum in a fashion well known in the vacuum deposition, vapor deposition or sputtering art. The source material stream 362 travels linearly until it is obstructed by the baffle structures 375 and 376 or it strikes the features on the substrate at a glancing angle. It can be seen that no source material will strike the substrate features at an angle greater than the path from the source target and the edge of the baffle 376. The geometry and arrangement of the vertical fins will govern the degree of source material deposition on different portions of the feature surfaces. By varying the baffle position relative to the source material target while the substrate is rolled past the baffle, the deposition angle can be varied from the bottom to the top of the screen in a way that corresponds with the angle or angles that light from the projector impinges upon the screen.

Alternative methods of transforming selected regions of the feature surfaces from absorbing to reflecting include the following: All features of the substrate may be fully coated with either a light absorbing or a light reflecting photosensitive material, such as a silver halide emulsion, for example. Then the screen surface is exposed to either a point radiation source, i.e. radial exposure, a line radiation source, i.e. linear exposure, or a scanning beam of radiation that will permanently transform the photosensitive material to the opposite state. Alternatively the coating material could be thermosensitive. An additional method to transform surface features from light absorbing to light reflecting is through the use of jetted materials at a glancing angle. This may be done in a scanning fashion. An additional method is to mechanically transform the surfaces of the features from light absorbing to light reflecting. These mechanical methods include abrasion, and cutting. Additional methods of surface alteration include chemical such as etching, electro chemical, photochemical, or electrostatic. Another method is to coat the substrate with a light-sensitive absorbing material, and expose the light-sensitive absorbing material at a glancing angle to cause exposed faces to become reflective to create the set of reflective areas on the exposed faces. Alternatively, the substrate may be coated with a light-sensitive reflecting material, and the light-sensitive reflecting material exposed at a glancing angle to cause exposed faces to darken to create the set of absorptive areas on the exposed faces. Another method includes depositing a light-reflecting material on certain faces of a light-absorbing substrate with the certain faces directed to a first set of angles facing a source of image light using either an electro-photographic process, an electro-chemical process, or combination of both to create a set of reflective areas. Alternatively, a method may include depositing a light-absorbing material on certain faces of a light-reflecting substrate with the certain faces directed to other than the first set of angles using either an electro-photographic process, an electro-chemical process, or combination of both to create the set of absorptive areas.

The screen may be used for non-visible projector light and/or non-visible ambient light, rather than or in addition to visible light. For example, some applications may be designed for enhancement of screen contrast for ultraviolet light or infrared light.

Figure 7:
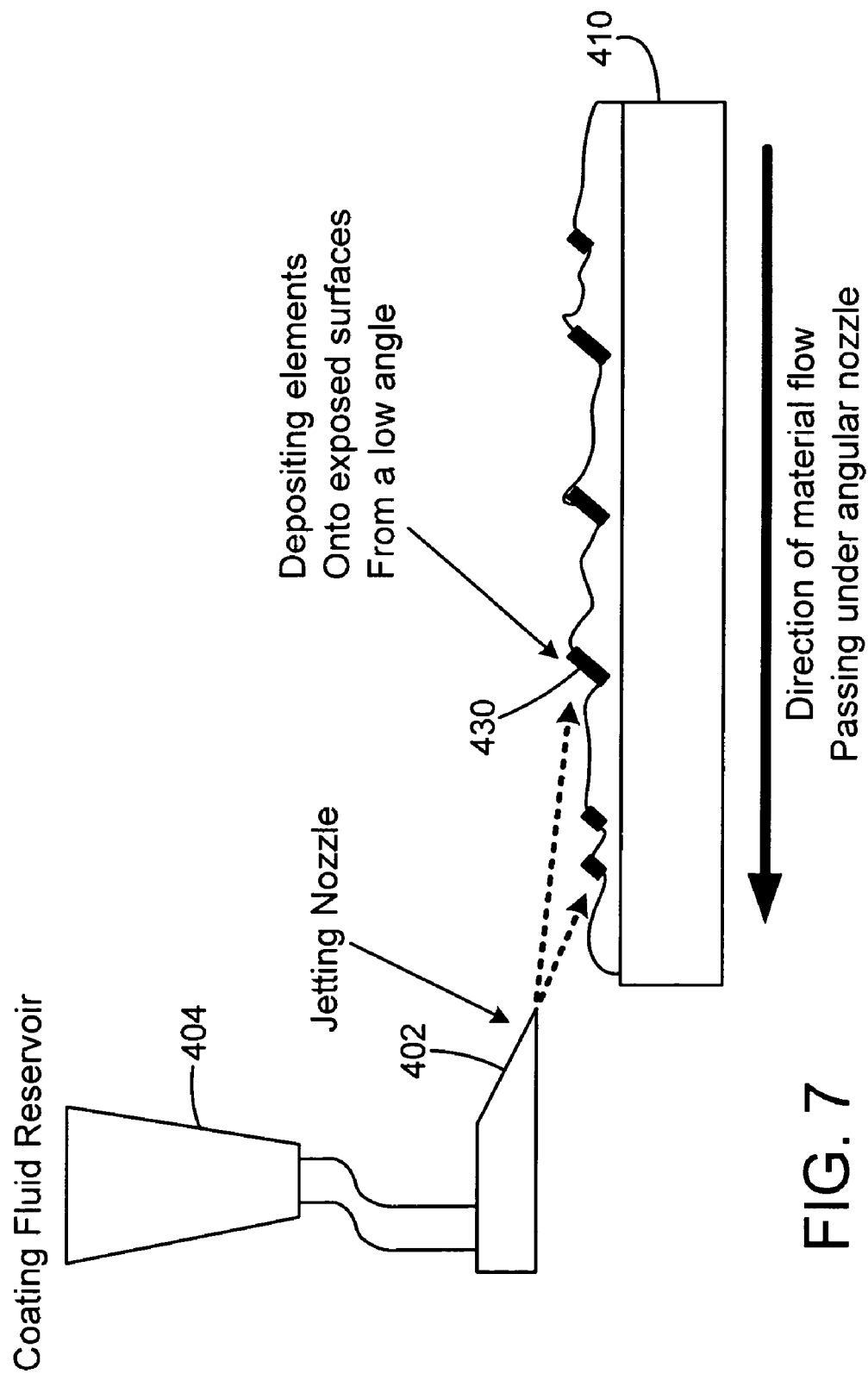
FIG. 7 diagrammatically depicts a method of jetting absorptive or reflective elements onto exposed surfaces of a featured substrate.

FIG. 7 diagrammatically depicts a method of jetting absorptive or reflective elements onto exposed surfaces of a featured substrate 410. A jetting nozzle 402 is connected to a coating reservoir 404, and is positioned to jet the coating fluid or particles onto the substrate at a low angle. The jetting nozzle may be an angular nozzle for emitting the fluid or particles at the low angle. The jetting nozzle may operate under fluid pressure, by way of example only. Other embodiments may use other mechanisms for ejecting the coating material. The substrate 410 may be moved past the jetting nozzle in the direction indicated in FIG. 7, and may be in sheet or roll form.

FIG. 8 illustrates another embodiment of a screen substrate 430, in which a first layer 440 of light absorbing material is selectively deposited on portions of the surface features 432 of the screen substrate which will be faced toward a source of ambient light, and a second layer 442 of reflective material is selectively deposited on portions of the surface features facing the projector. The order of placement of the first and second layers may be reversed, so that the reflective material is deposited first and the reflective material is next deposited.

Although the foregoing has been a description and illustration of specific embodiments, various modifications and changes can be made by persons skilled in the art without departing from the scope and spirit of the subject matter.

What is claimed is:

1. A projection screen for receiving projector light from a projector facing direction, the screen comprising:
    a substrate having a plurality of irregular features, wherein said features each have;
    a reflective surface area portion oriented to a projector facing direction so as to reflect light received from a projector, and
    an absorptive surface area portion oriented to non-projector facing directions so as to absorb ambient light from sources other than said projector.

2. The projection screen of claim 1, wherein the plurality of features include convex hemispheres or convex conic sections.

3. The projection screen of claim 1, wherein the plurality of features include concave hemispheres or concave conic sections.

4. The projection screen of claim 1, wherein the plurality of features include a combination of convex and concave conic sections.

5. The projection screen of claim 1, wherein the plurality of features have non-symmetric geometries.

6. The projection screen of claim 1, wherein the plurality of features have irregularly shaped geometries.

7. The projection screen of claim 1, wherein the substrate has been embossed or micro-machined to form the plurality of features.

8. The projection screen of claim 1, wherein the substrate includes a substrate base coated with particles to form the plurality of features.

9. The projection screen of claim 1, wherein the plurality of features includes an array of generally rounded dimples or protrusions.

10. The projection screen of claim 1, wherein the substrate has a front surface texture formed from woven cloth, or cloth-like material.

11. The projection screen of claim 1, wherein the substrate is fabricated of a light-absorbing material, and the set of reflective areas are obtained by depositing light-reflective material at a glancing angle onto the substrate.

12. The projection screen of claim 1, wherein the substrate is fabricated of a light-reflective material, and the set of absorptive areas are formed by depositing light-absorbing material at a glancing angle onto the substrate.

13. The projection screen of claim 1, wherein the plurality of features have an average feature width in a range from about 75 microns to 150 microns.

14. A screen for receiving image light from an image source, the screen comprising:
    a substrate having a plurality of irregular features extending from said substrate;
    wherein said substrate is fabricated of a transparent material, and a side of each of said features is reflective of light from said image source that is incident on a rear surface of and pass through the substrate.

* * * * *